United States Patent
Henderson et al.

(10) Patent No.: US 7,895,590 B2
(45) Date of Patent: Feb. 22, 2011

(54) UPDATE AT SHUTDOWN

(75) Inventors: Gary S Henderson, Redmond, WA (US); David Switzer, Seattle, WA (US); Chung Yiu Chow, Kirkland, WA (US); Cristian Marius Ilac, Sammamish, WA (US); Cathelijne Bertels, Kirkland, WA (US); Richard J Swaney, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 943 days.

(21) Appl. No.: 10/934,343

(22) Filed: Sep. 3, 2004

(65) Prior Publication Data
US 2006/0053417 A1    Mar. 9, 2006

(51) Int. Cl.
G06F 9/44    (2006.01)
G06F 9/445   (2006.01)
G06F 15/177  (2006.01)

(52) U.S. Cl. ........................ 717/168; 717/174; 709/220

(58) Field of Classification Search ........................ None
See application file for complete search history.

(56) References Cited

U.S. PATENT DOCUMENTS

| | | | | |
|---|---|---|---|---|
| 5,732,275 A | * | 3/1998 | Kullick et al. | 717/170 |
| 6,167,567 A | * | 12/2000 | Chiles et al. | 717/173 |
| 6,195,750 B1 | * | 2/2001 | Ellsworth | 713/100 |
| 6,373,498 B1 | * | 4/2002 | Abgrall | 345/619 |
| 6,385,707 B1 | * | 5/2002 | Maffezzoni | 711/162 |
| 6,941,453 B2 | * | 9/2005 | Rao | 713/2 |
| 7,016,944 B1 | * | 3/2006 | Meyer et al. | 709/218 |
| 7,149,789 B2 | * | 12/2006 | Slivka et al. | 709/219 |
| 2004/0093592 A1 | * | 5/2004 | Rao | 717/168 |
| 2004/0093597 A1 | * | 5/2004 | Rao et al. | 717/171 |
| 2005/0177768 A1 | * | 8/2005 | Imamura | 714/13 |

* cited by examiner

*Primary Examiner*—Michael J Yigdall
*Assistant Examiner*—Evral Bodden
(74) *Attorney, Agent, or Firm*—Workman Nydegger

(57) ABSTRACT

An update at shutdown process is disclosed that installs software updates on a computer during the computer's shutdown procedures. On a computing device with an automated shutdown procedure, during the shutdown procedure an update at shutdown process is executed. The update at shutdown process evaluates whether any software updates are currently stored, or are locally available, on the computing device. If there are software updates to be installed, a further evaluation determines whether any of the software updates may be installed without any user interaction. Accordingly, each downloaded/locally available software update that is identified as being installable without user interaction, is installed during the shutdown procedure, thus minimizing the impact that the software updates have on the computer user's use time.

17 Claims, 4 Drawing Sheets

UPDATE AT SHUTDOWN

FIELD OF THE INVENTION

The present invention relates to computer software, and more particularly, performing computer software updates on a computer during a shutdown process.

BACKGROUND OF THE INVENTION

As most computer users will recognize, software updates are almost always inevitable. Software updates arise for any number of reasons, including, but not limited to, fixing software bugs, addressing security weaknesses or threats, enhancing current features, adding new features, supporting an updated operating system, supporting new hardware, and the like.

Generally speaking, software update installation is not convenient for computer users, as the installation usually impacts a computer user's use time (i.e., that period of time when the computer user interacts with the computer). In order to install most software updates, the computer must be operational. Unfortunately, the computer is usually, though not always, only operational during the computer user's use time. Additionally, as almost anyone who has installed a software update on a computer system will readily recognize, a typical software update installation will, at least temporarily, dominate the computer's operations, putting all other operations on hold, as well as dominate the computer user's focus. In fact, many software update installation processes require that other software programs be shut down so that they do not interfere with the installation process, as well as require substantial computer user attention and interaction.

In addition to dominating the computer during the installation process, those familiar with computer software updates will also recognize that after installing a software update, the updated software, and frequently the entire computer system, must be restarted in order to be fully operational. To this end, many of the software updates provide an automatic reboot process (for rebooting either the updated program or the entire computer system). Thus, the computer user is frequently forced to wait while the software update installs, and further wait while the computer system shuts down and restarts.

As can be seen from the above description, a computer user almost always loses precious time by installing a software update. This is true even though many software updates might not require any user interaction during installation, but simply need the computer system to be operational (which directly corresponds to the computer user's use time). Accordingly, what is needed is a system and method for installing software updates in a manner that minimizes the impact on a computer user's use time. The present invention addresses this and other issues in the prior art.

SUMMARY OF THE INVENTION

In accordance with aspects of the present invention, a method for installing updates on a computer system, during a shutdown procedure, is presented. During the shutdown procedure, a determination is made as to whether a software update is ready to be installed on the computer system. If a software update is ready to be installed on the computer system, the software update is installed during the computer system's shutdown procedure.

In accordance with further aspects of the present invention, a computer system for installing software updates during a shutdown procedure is presented. The computer system comprises a computing device and an operating system. During the shutdown procedure, the computer system determines whether a software update is available for installation on the computer system. If a software update is available for installation on the computer system, the software update is installed onto the computer system during the computer system's shutdown procedure.

In accordance with yet further aspects of the present invention, a computer-readable medium bearing computer-executable instructions which, when executed on a computing device, carry out a method for installing software updates on the computing device is presented. When the computer-executable instructions are executed, a determination is made as to whether a software update is ready to be installed on the computing device. If a software update is ready to be installed on the computing device, another determination is made as to whether the software update requires any user interaction during installation. If the software update is ready to install and does not require any user interaction during its installation, the software update is installed onto the computing device during the computing device's shutdown procedure.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1A:
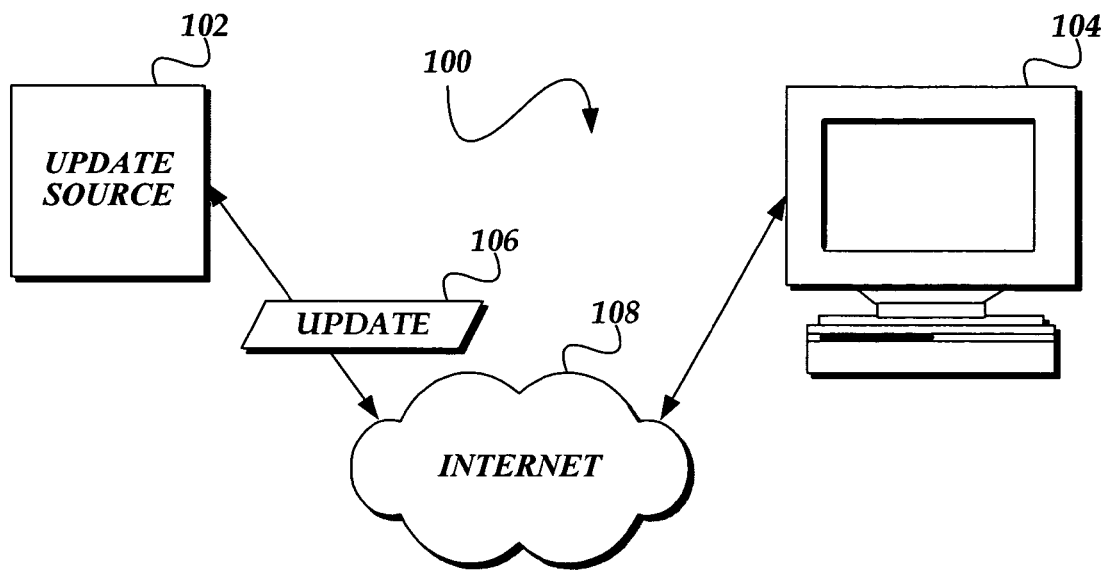
FIG. 1A is a pictorial diagram illustrating an exemplary networked environment suitable for obtaining software updates for installation on a computer.

As alluded to above, most modern computer systems include an automated shutdown procedure, which when activated, performs all necessary shutdown processes and causes the computer system to turn off. For example, most personal computers, in conjunction with an operating system such as Microsoft Corporation's Windows family of operating systems, include an automated, or automatic, shutdown procedure. As will be described below, the present invention takes advantage of these computer systems to include an update at shutdown process. By combining a software update process with the shutdown procedures of these computer systems, in addition to selectively installing only those software updates that can be installed without any computer user interaction, intrusion into the computer user's use time is minimized. In other words, a computer user typically directs the computer system to shutdown and can then leave the computer unattended, knowing that the computer system will perform any necessary shutdown tasks and then turn itself off.

Prior to beginning the shutdown procedure, a computer system is fully operational. Thus, shortly after the computer user directs the computer system to shut down, while the computer system is still sufficiently operational, the update at shutdown process is carried out. As will be described below, according to aspects of the present invention, in conjunction with the user interface through which the computer user directs the computer system to shut down, an indication is provided to the computer user that an update at shutdown process will be executed.

It should be noted that while the present invention, and preferred embodiment, is described in terms of update at shutdown, in an alternative embodiment, the present invention could be equally applied to other circumstances. For example, when a user needs to reboot his computer system for some reason other than updates, the update process could be automatically invoked. Those skilled in the art will recognize that the update process would add relatively little additional "delay" time to the already pending reboot process. However, while the present invention may be applied to instances other than shutdown, for simplicity purposes, the present invention will be described only in terms of update at shutdown.

It should be further noted that while the present invention is discussed in terms of installing software updates onto a computer, alternatively, the present invention could be applied to uninstalling software updates from the computer. More particularly, removing outdated or unwanted software from a computer frequently involves the update process, and just as installation is computer consuming, so is "uninstallation." Accordingly, while the discussion of the present invention is made in terms of installing software updates during an update at shutdown (or reboot) process, it is for simplicity of description, and should not be construed as limiting upon the present invention.

While software updates may be obtained from a variety of sources, according to aspects of the present invention, in order for updates at shutdown to occur, each software update to be installed during shutdown must already be downloaded and/or locally available to the computer system. For example, FIG. 1A is a pictorial diagram illustrating an exemplary networked environment 100 suitable for obtaining a software update 106 for installation onto a computer 104. As those skilled in the art will recognize, in many instances, a computer 104 obtains, either automatically or according to user direction, a software update 106 over a network, such as the Internet 108, from an update source 102. The update source may be a site maintained by the software provider, a third party distribution location, a corporate update center, or the like. Once the software update 106 is locally available, in other words, all of the files necessary for installing the software are available on the computer system 104, the update process, and, in particular, the update at shutdown process, may occur.

Figure 1B:
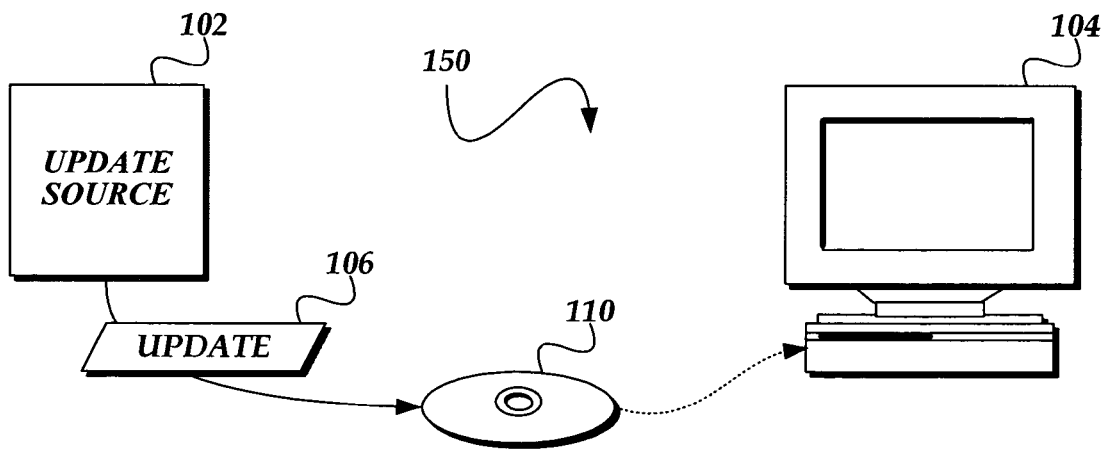
FIG. 1B is a pictorial diagram illustrating an alternative exemplary environment suitable for obtaining software updates for installation on a computer.

While more and more software updates are made available via a network connection, some software updates are delivered on computer-readable media. FIG. 1B is a pictorial diagram illustrating an alternative environment 150 for obtaining a software update 106 for installation onto a computer from an update source 102. In particular, the update source 102 writes the software update 106 onto a computer-readable media 110, such as a DVD or CD-ROM disk, a floppy disk, a magnetic tape, or the like. The computer-readable media 110 is delivered to the computer user. The computer user then reads the computer-readable media 110 using the computer 104. The software update 106 may either be copied onto a non-removable storage device in the computer 104 or, alternatively, remain on the computer-readable medium 110. According to aspects of the present invention, the software update 106 may be installed from the computer-readable media 110 provided that the computer-readable media remains in the computer 104 during the update at shutdown process.

The rationale behind having the software update stored on the computer 104 is that during the shutdown process, only those connections that are currently available are accessed by the system. If a network connection is unavailable at shutdown, the update at shutdown process does not establish a network connection. Accordingly, though the computer system 104 must be operational, the update at shutdown process relies upon a subset of the operational functionality.

It should be noted that while the present discussion has been generally directed to a personal computer, it is for illustration purposes only and should not be construed as limiting upon the present invention. The update at shutdown process may be used on any number of different computing devices that support a software update process, including, but not limited to, mini- and mainframe computers, personal digital assistants (PDAs), notebook computers, and tablet computers, as well as mobile telephone devices, hybrid PDA/telephone devices, and the like. Additionally, while the present discussion states that a software update must be downloaded onto the computer system 104 in order to install the update in an update at shutdown process, it is not limited to downloading the software update onto an internal hard drive. As previously mentioned, the software update may be stored on computer-readable media 110, or alternatively, the software update could be stored in memory, on an internal disk drive, in flash memory, ROM, and the like, including any combination of them.

Figure 2:
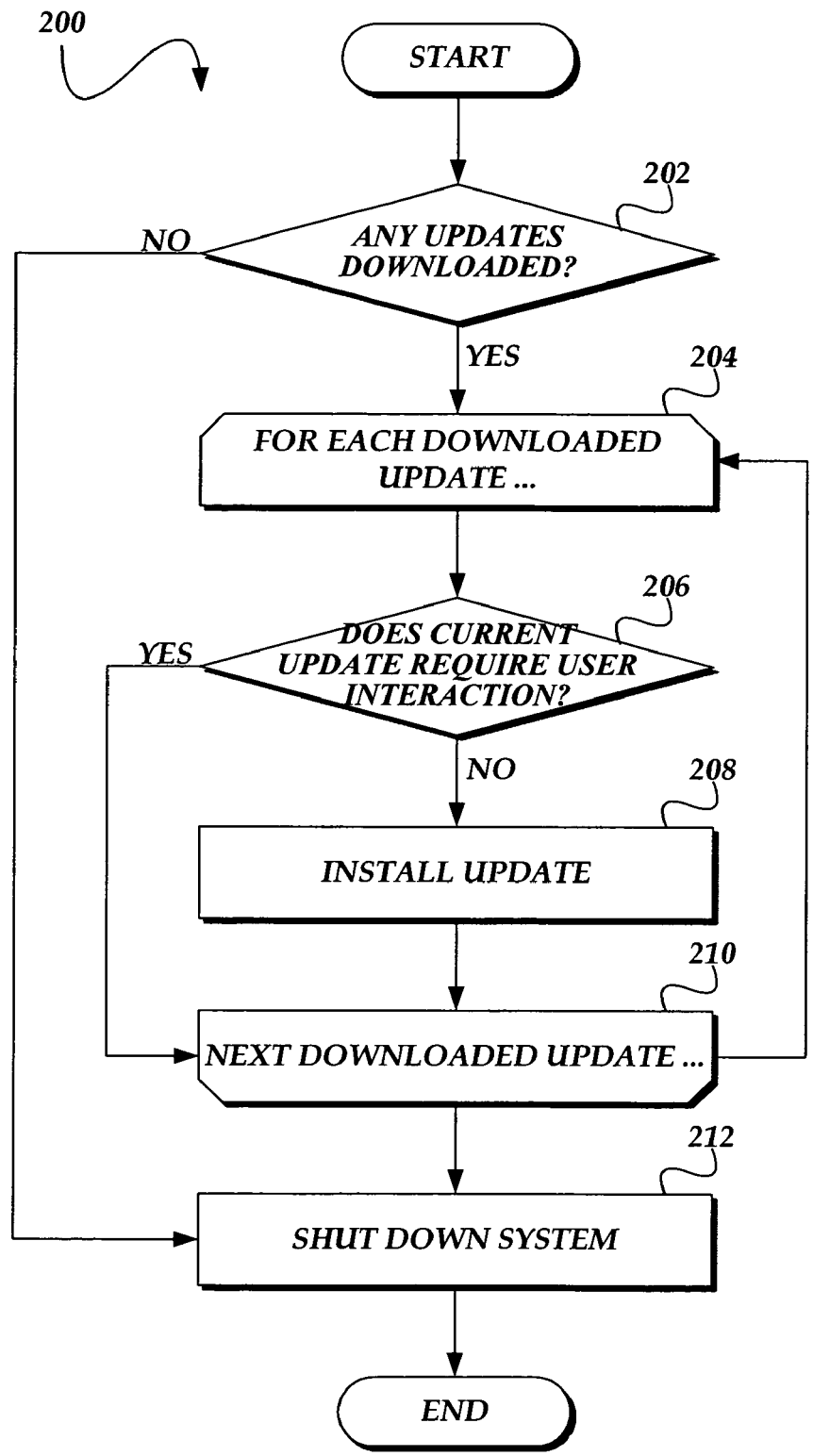
FIG. 2 is a flow diagram illustrating an exemplary shutdown routine suitable for performing an update at shutdown process.

As those skilled in the art will appreciate, many functions are carried out by/during shutdown procedure on a computer. When adapted according to the present invention, an additional process includes update at shutdown. FIG. 2 represents a flow diagram illustrating an exemplary routine 200 for carrying out software update installation at shutdown. Beginning at decision block 202, a determination is made as to whether there are any software updates that are currently downloaded onto the computer system 104. If there are no software updates downloaded onto the computer system 104, the routine 200 proceeds to block 212 where the remainder of the shutdown procedures are carried out. Thereafter, the routine 200 terminates.

Alternatively, at decision block 202, if there are software updates that are currently downloaded to the computer system 104, the routine 200 moves into a looping structure to install suitable downloaded software updates. Thus, at block 204, a loop is begun to iterate through each of the software updates downloaded onto the computer system 104. More particularly, for each software update downloaded onto the computer system, at decision block 206, a determination is made as to whether the currently examined software update requires any user interaction to be installed. If the currently examined software update does not require user interaction, at block 208, the software update is installed. Thereafter, or if, at decision block 206, the currently examined software update requires user interaction, the routine 200 proceeds to block 210, which is the end of the looping structure.

According to aspects of the present invention, determining whether a software update is suitable for update at shutdown comprises examining a value associated with the software update that indicates whether user interaction is required.

Typically, the software update provider, i.e., the one who creates the software update, must determine whether the software update requires user interaction and, correspondingly, must set the value to indicate whether or not user interaction is required during installation. This value may be a value stored within the software update itself or in metadata related to the software update.

At block 210, if there are any additional downloaded software updates on the computer system 104, the routine 200 returns again to block 204, block 204 being the beginning of the looping structure, to evaluate another downloaded software update. This loop continues until, at block 210, there are no more downloaded software updates. When it is determined that there are no more software updates to be examined, the routine 200 proceeds to block 212 where the remainder of the shutdown procedures are carried out, and the routine 200 terminates.

While FIG. 2 discussed various steps that occur in an exemplary method 200 for performing a software update installation at shutdown, those skilled in the art will appreciate that other steps (not shown) may also occur in conjunction with the described steps. For example, in one embodiment, prior to performing the update at shutdown procedure, a test is made that the computer is running on AC power, rather than on batteries. Accordingly, the above-described steps should be viewed as illustrative, and should not be construed as limiting upon the present invention.

Figure 3:
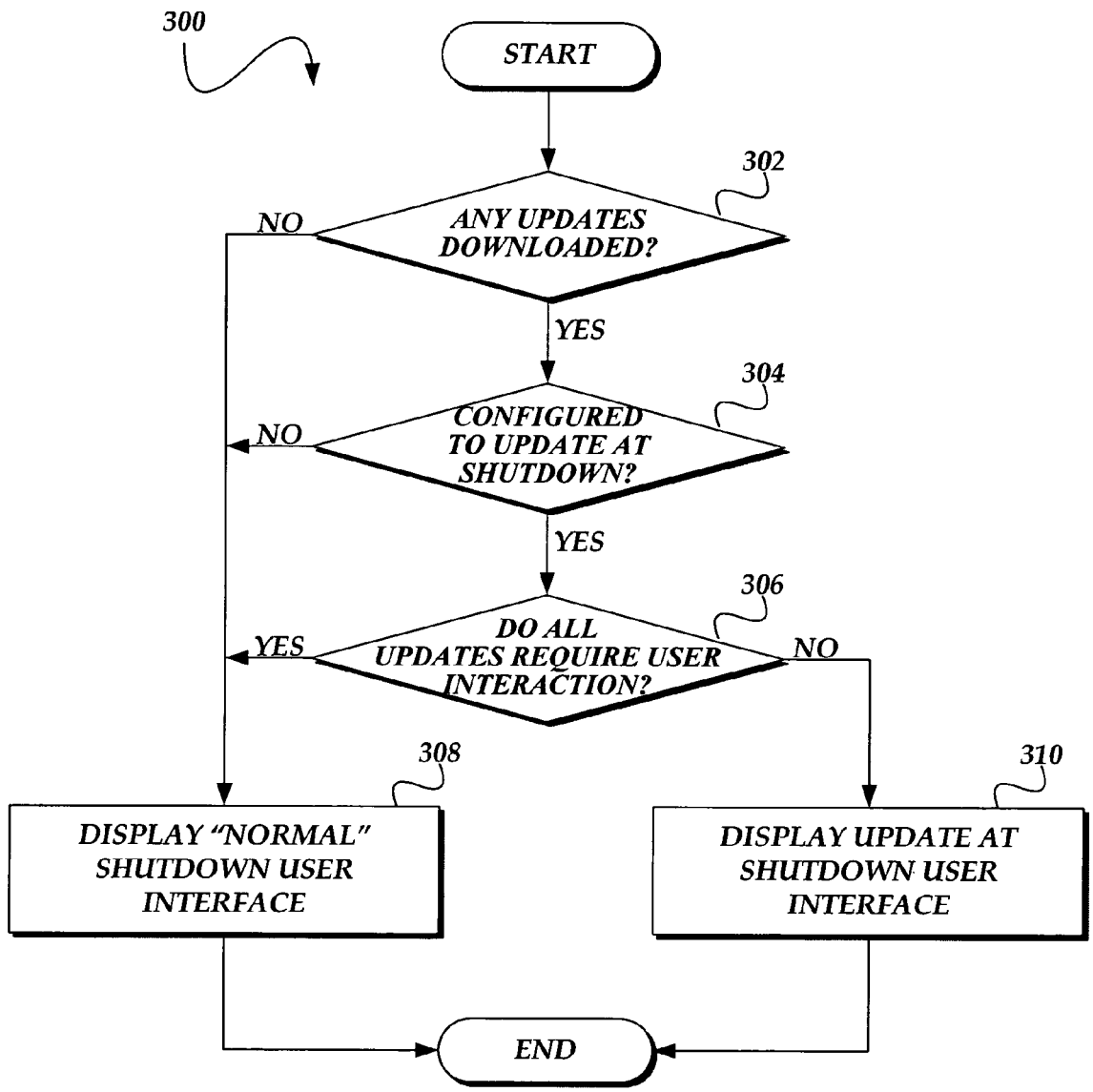
FIG. 3 is a flow diagram illustrating an exemplary user interface routine for indicating to a computer user whether an update at shutdown will occur.
Figure 4:
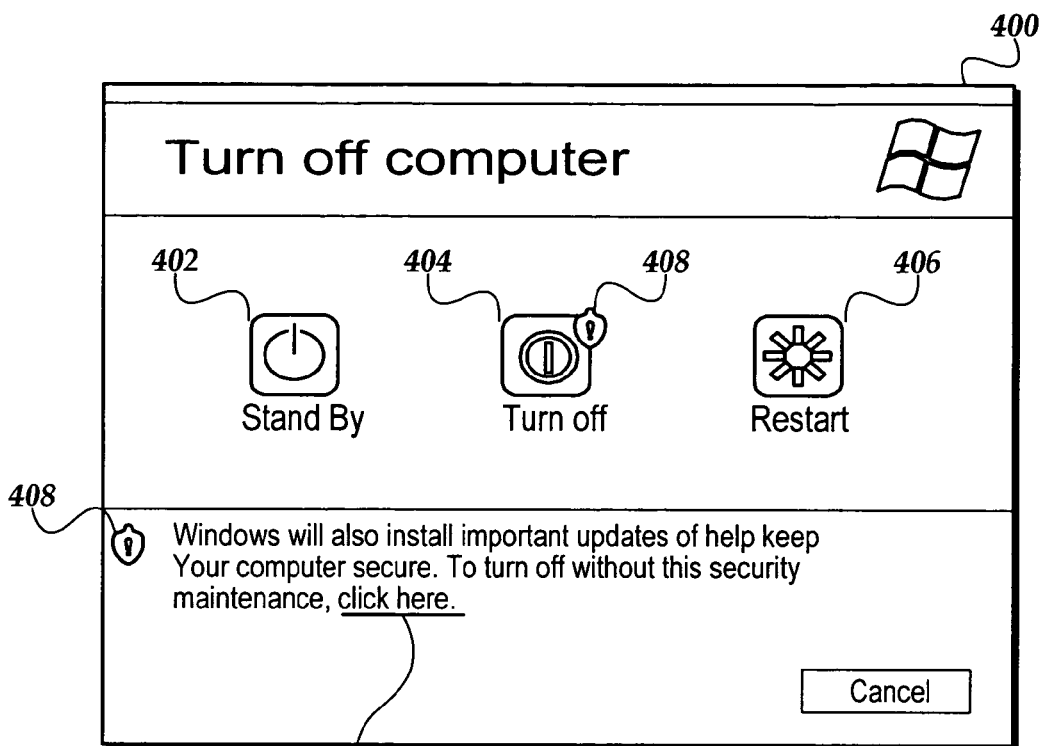
FIG. 4 is a pictorial diagram illustrating an exemplary user interface dialog box for indicating that an update at shutdown will occur and permitting a user to bypass the update at shutdown process.
Figure 5:
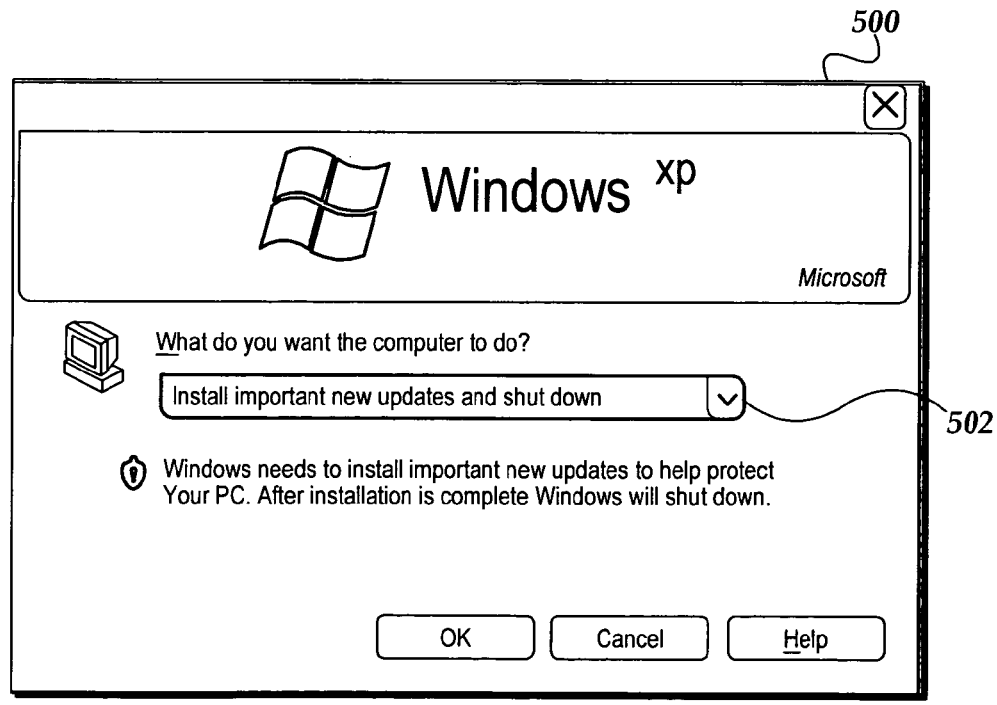
FIG. 5 is a pictorial diagram illustrating another exemplary dialog for permitting the user to configure the computer system to bypass an update at shutdown process.

As those skilled in the art will appreciate, a computer system's shutdown procedure, which would include the update at shutdown process described above, is usually initiated by the user though a user interface. According to aspects of the present invention, when the computer system is configured to provide update at shutdown services, the computer system provides some feedback, via the user interface, that a software update will be installed during the shutdown process. FIG. 3 is a flow diagram illustrating an exemplary routine 300 for displaying user interface messages indicating that update at shutdown will occur, and FIGS. 4 and 5 are pictorial diagrams illustrating exemplary user interface dialogs 400 and 500 associated with update at shutdown.

With regard to FIG. 3, beginning at decision block 302, a determination is made as to whether there are any software updates downloaded on the computer system 104. If there are no software updates downloaded on the computer system, at block 308, the typical, or "normal," shutdown user interface is displayed to the computer user. Thereafter, the routine 300 terminates.

Alternatively, if there are software updates downloaded onto the computer system 104, at decision block 304, a further determination is made as to whether the computer system has been configured to install software updates in the shutdown procedure. Thus, according to aspects of the present invention, the computer system may be selectively configured to install software updates during the shutdown procedure. If the computer system has not been configured to install software updates in the shutdown procedure, at block 308, the typical shutdown user interface is displayed to the computer user, and the routine 300 terminates.

However, if, at decision block 304, the computer system 104 is configured to install software updates at shutdown, the routine 300 proceeds to decision block 306. At decision block 306, another determination is made as to whether all of the downloaded software updates require some user interaction. Stated another way, a determination is made as to whether any of the downloaded software updates may be installed without user interaction.

According to aspects of the present invention, if a software update requires any user interaction during its installation, that software update is not a candidate for installation during the shutdown process. Examples of user interaction include making requests regarding the destination location of documents, the type of installation (i.e., typical, minimal, optimal, etc.), user profile information, user-supplied installation keys, accepting end-user license agreements, and the like. As indicated above, the shutdown procedures are generally "walk-away" procedures, i.e., the computer user initiates the shutdown procedures and can walk away from the computer knowing that ultimately the computer will shut down. Thus, if a software update requires any user interaction during its installation, a computer user could not "walk away" during its installation. In this light, according to additional aspects of the present invention, the update at shutdown process installs only those downloaded software updates that are, or can be, identified as requiring no user interaction.

At decision block 306, if all downloaded software updates require some user interaction, or cannot be identified as not requiring user interaction, at block 308, the typical shutdown user interface is displayed to the computer user, and the routine 300 terminates. Alternatively, if at least one downloaded software update is identified as not requiring any user interaction, at block 312, an update at shutdown user interface is displayed to the computer user. Thereafter, the routine 300 terminates.

FIG. 4 is a pictorial diagram illustrating an exemplary user interface dialog box 400 for indicating that a software update installation will occur during shutdown procedures. As those skilled in the art will recognize, the exemplary user interface dialog box 400 is based on a typical shutdown dialog box that includes typical user interaction icons, such as a standby icon 402 for instructing the computer to enter a stand by mode, a shutdown icon 404 for instructing the computer to shut down, and a restart icon 406 for instructing the computer to shut down and restart. Also in the exemplary update at shutdown dialog box 400 is an update indicator 408 overlapping the shutdown icon 404. The update icon 408 is also displayed with some associated, explanatory text informing the computer user that an update at shutdown could occur if the shutdown icon 404 is actioned, as well as providing a link 410 for additional instructions to bypass the update at shutdown process.

According to one embodiment of the present invention, actioning/clicking the link 410 would result in the computer system bypassing the update at shutdown process. Alternatively, by actioning/clicking the link 410 would result in an additional user interface dialog box being displayed to assist the user in opting out of the update at shutdown process, such as described in regard to FIG. 5.

FIG. 5 is a pictorial diagram illustrating the exemplary dialog box 500 for opting out of an update at shutdown. In particular, a drop-down window 502 in the dialog box 500 is used to permit a user to at least temporarily disable the update at shutdown process.

While FIGS. 4 and 5 illustrate exemplary user interface dialog boxes, it should be understood that they are representative of what could be displayed. Those skilled in the art will readily recognize that any number of mechanisms may be used to indicate to the user that an update at shutdown process will occur, and to further provide the user with the ability to bypass that process if desired. Accordingly, the present invention should not be construed as limited to the dialog boxes illustrated in these figures.

While not shown, even though the update occurs at shutdown, the update at shutdown process could optionally display update progress, such as displaying a completion bar or the like.

While various embodiments of the present invention have been illustrated and described, including the preferred embodiment, it will be appreciated that various changes can be made therein without departing from the spirit and scope of the invention.

The embodiments of the invention in which an exclusive property or privilege is claimed are defined as follows:

1. On a computing system that includes an operating system a method for installing software updates during a shutdown procedure of the operating system and in a manner that does not require user intervention and that allows a user to walk away knowing that the computing system will shut down, the method comprising:
   receiving a user command requesting shut down of the operating system of the computing system; and
   after receiving the user command requesting shut down of the operating system of the computing system, and in response thereto:
      determining whether a software update is available for installation on the computing system;
      evaluating each software update that is determined to be available for installation, and distinguishing between software updates that require the user of the computing system to interact with the computing system during installation of such updates for successful installation thereof, and software updates that do not require the user of the computing system to interact with the computing system during installation for successful installation thereof;
      when a software update that is determined to be available for installation is also determined not to require user interaction during installation, automatically installing the software update during the requested shut down of the operating system; and
      when a software update that is determined to be available for installation and is determined to also require user interaction during installation, automatically abstaining from installing the software update so that it is not installed during the requested shut down of the operating system, notwithstanding the availability of the software update, and due to the software updating requiring user interaction during installation.

2. The method of claim 1, wherein determining whether a software update is available for installation on the computing system comprises determining whether the software update is locally available to the computing system.

3. The method of claim 2, wherein determining whether a software update is available for installation on the computing system further comprises determining whether the software update is stored on the computing system.

4. The method of claim 1, wherein determining whether the software update requires any user interaction during installation comprises evaluating a value associated with the software update that indicates whether the software update requires any user interaction during installation.

5. The method of claim 4, wherein the value associated with the software update that indicates whether the software update requires any user interaction during installation is stored in metadata associated with the software update.

6. The method of claim 4, wherein the value associated with the software update that indicates whether the software update requires any user interaction during installation is stored within the software update.

7. The method of claim 4 further comprising, prior to installing the software update on the computer system, displaying user interface information to a user that indicates that the software update will be installed onto the computer system during the shut down of the operating system.

8. The method of claim 7 further comprising displaying additional user interface information to the user through which the user can selectively configure the computer system to not install the software update during the shut down of the operating system.

9. A computer system for installing software updates during a shutdown procedure, the computer system comprising:
   a computing device;
   an operating system; and
   computer-readable media having stored thereon instructions that cause the computing device to perform the method of claim 1.

10. The computer system of claim 9, wherein determining whether a software update is available for installation on the computing system comprises determining whether the software update is locally available to the computing system.

11. The computer system of claim 10, wherein determining whether a software update is available for installation on the computing system further comprises determining whether the software update is stored on the computing system.

12. The computer system of claim 9, wherein determining whether the software update requires any user interaction during installation comprises evaluating a value associated with the software update that indicates whether the software update requires any user interaction during installation.

13. The computer system of claim 12, wherein the value associated with the software update that indicates whether the software update requires any user interaction during installation is stored in metadata associated with the software update.

14. The computer system of claim 12, wherein the value associated with the software update that indicates whether the software update requires any user interaction during installation is stored within the software update.

15. The computer system of claim 12 further comprising, prior to installing the software update on the computer system, displaying user interface information to a user that indicates that the software update will be installed onto the computer system during the shut down of the operating system.

16. The computer system of claim 15 further comprising displaying additional user interface information to the user through which the user can selectively configure the computer system to not install the software update during the shut down of the operating system.

17. A computer-readable medium bearing computer-executable instructions which, when executed on a computing device having a shutdown procedure, carries out a method for installing software updates during the shutdown procedure, the method comprising:
   receiving a user command requesting shut down of an operating system of the computing system; and
   after receiving the user command requesting shut down of the operating system of the computing system, and in response thereto:
      determining whether a software update is available for installation on the computing device;
      evaluating each software update that is determined to be available for installation, and distinguishing between software updates that require the user of the computing device to interact with the computing device during installation for successful installation thereof, and software updates that do not require the user to interact with the computing device during installation for successful installation thereof;

when a software update that is determined to be available for installation is also determined not to require any user interaction during installation, automatically installing the software update during the requested shut down of the operating system on the computing device;

when a software update that is determined to be available for installation and is determined to also require user interaction during installation, automatically abstaining from installing the software update so that it is not installed during the requested shut down of the operating system, notwithstanding the availability of the software update, and due to the software updating requiring user interaction during installation; and when multiple software updates are determined to be available and to also not require user interaction during installation, collectively and automatically installing each of the multiple software updates not requiring user interaction during installation, and without user interaction, during the shut down of the operating system.

\* \* \* \* \*